July 8, 1924.  1,500,394
G. C. KENNEDY
AUXILIARY FREIGHT CARRIER FOR VEHICLES
Filed Dec. 7, 1922
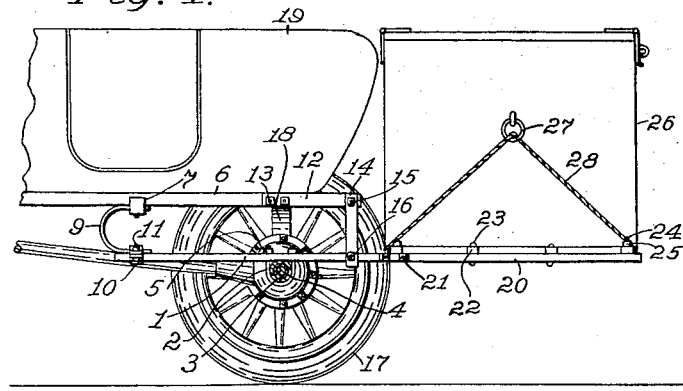
Fig. 1.
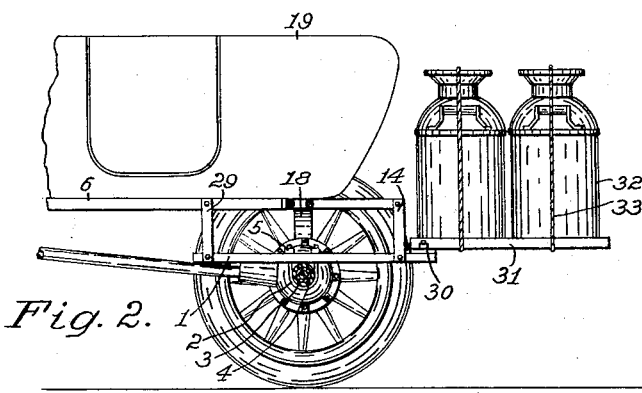
Fig. 2.
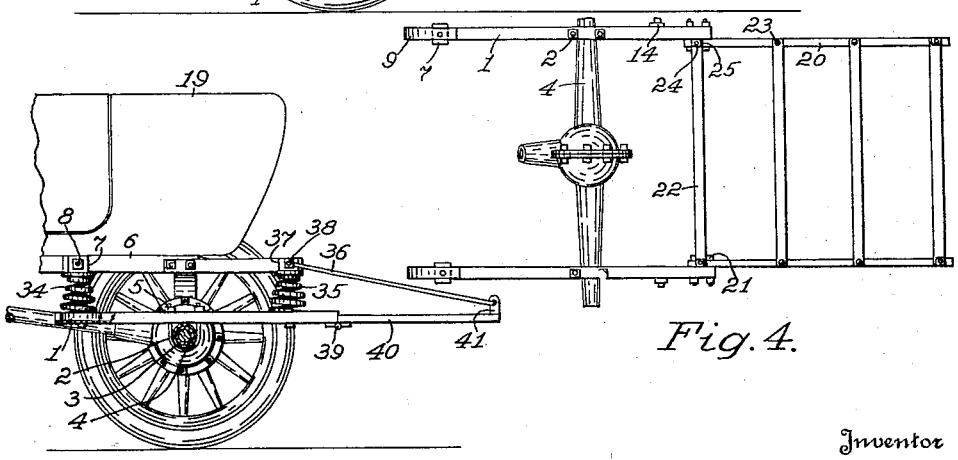
Fig. 3.
Fig. 4.
Inventor
George Colvin Kennedy.

Patented July 8, 1924.

UNITED STATES PATENT OFFICE.

GEORGE COLVIN KENNEDY, OF WATERLOO, IOWA.

AUXILIARY FREIGHT CARRIER FOR VEHICLES.

Application filed December 7, 1922. Serial No. 605,428.

*To all whom it may concern:*

Be it known that I, GEORGE COLVIN KENNEDY, a citizen of the United States of America, and a resident of Waterloo, Blackhawk County, Iowa, have invented certain new and useful Improvements in Auxiliary Freight Carriers for Vehicles, of which the following is a specification.

My invention relates to improvements in auxiliary freight carriers for vehicles, particularly for self-propelled vehicles, and the object of my improvement is to provide means loosely bearing upon a rear axle of the vehicle to sustain a load, said means including devices for movably bearing against the vehicle frame for balancing the load upon the axle and for absorbing shocks or jars upon the vehicle.

This object is accomplished by the means which are hereinafter described and claimed, and which are illustrated in the accompanying drawings, in which Figs. 1, 2 and 3 are respectively fragmental side elevations of the rear portion of a motor-vehicle, with parts sectioned or broken away, showing differently modified types of my invention as mounted thereon, and Fig. 4 is a top plan of the freight carrier shown in said Fig. 1.

Similar numerals of reference denote corresponding parts throughout the several views.

The rear part only of a light motor-vehicle of a well-known type is shown in which the body 19 is mounted upon an elongated hollow frame having side-beams 6 supported at the rear upon a transverse semi-elliptic spring 18, and the ends of the latter supported and connected by means not shown to the ends of the rear axle-housing 4, the latter including the usual differential casing, the axle in said housing having its parts connected to the carrying and traction wheels 17.

My auxiliary freight carrier is composed of but few and simple elements, all made up of stock shapes ordinarily carried on hand everywhere, so that the construction is inexpensive.

The numeral 1 denotes a pair of like bars positioned medially across the end parts of the housing and secured thereto loosely or so as to rock thereon by means of U-bolts 2 and nuts 5. These bars may be of any cross sectional shape, square, oblong, channel- or angle-bars as may be desired. The U-bolts preferably bear against an inner sleeve 3 surrounding the housing 4, to prevent wear to the latter which might be caused by the rocking thereon of the U-bolts and the bars 1.

Referring first to said Fig. 1, the numeral 12 denotes a pair of bracket-arms secured by means of bolts or other fastenings to the rear end of the frame 6 to project rearwardly horizontally therefrom. Bar links 14 are pivotally connected between the rear extremities of said brackets and said bars 1 by bolts 15 and 16 respectively. On the forward extremities of the bars 1 clamps 10 are secured about the same and the lower rearwardly curved ends of U-shaped bar-springs 9 by means of bolts 11. The upper ends of these U-shaped springs may have U-shaped bodies secured by rivets thereon at 7, and the bodies 7 are shaped to receive and fit the under parts of the frame-bars 6 but need not be fastened thereto unless desired.

The rear ends of the bars 1 project rearwardly a short distance beyond the link-bars 14, and any desired kind of load-carrying device may be secured to or mounted thereon to support a load to the rear of the vehicle body 19.

As shown in said Fig. 1 in side elevation, and in plan in Fig. 4, this device comprises the extension-bars 20 whose forward ends are secured to the rear ends of the bars 1 by means of bolts 21. The bars 20 are connected by means of a plurality of cross-bars 22, all pivotally, the end pivots of the forward and rearmost cross-bars being pivot-bolts 24, while the inner cross-bars may be also so pivoted or by means of rivets at 23.

When so mounted on the bars 1, this device in extended position is quite rigid, but when the forward bolts 21 are removed the device may be folded into small compass because of the pivoting of the ends of the cross-bars 22. Upon the device may be placed any loading, a large box 26 being shown in Fig. 1, having end ears or rings 27 in which rope fastenings 28 may be secured.

The load-carrier of said Fig. 2 is similar, except that instead of a spring 9, link-bars 29 like the link-bars 14 are connected pivotally between the frame 6 and the forward ends of the bars 1. In the rear, in this case, a cross-bar 30 is secured across the rear ends of the bars 1 by means of bolts, and upon this cross-bar is secured a platform 31 to carry a load, milk-cans 32 being shown as secured by ropes 33 thereon.

Another modification is illustrated in said Fig. 3, wherein spring-connections 34 and 35 are positioned between the frame 6 and brackets 12 above and the opposite ends of the bars 1 below. Conical coiled springs are shown, but any kind of yieldable resilient elements may be used instead. These springs may be held at the top to the frame by means of sockets 7 and 37, secured by bolts 8 and 38 respectively. In this instance, a short platform of skeleton type 40 may be hingedly connected at each side to the bars 1 at 39, while a suspension-rod 36 on each side connects each bracket 12 and the rear end of the platform at its short corner standards 41.

In each modification of the invention, the whole load is carried by the rear axle-housing 4 being transmitted by means of the bars 1 thereto. The connections from the bars 1 at either end thereof, whether links or springs, merely serve to equalize this loading upon the axle-housing. In Fig. 1, in the first instance the load upon the carrier 20 by the link-bars 14 pulls downwardly upon the frame 6 and brackets 12, but as the axle-housing is the fulcrum, the forward arms of the bars 1 push up on the frame 6 by means of the springs an equal amount, less some yielding of the springs, so that the effect upon the frame is little, though the load is equalized upon the axle-housing, and shocks absorbed by said springs 9 and by the vehicle rear spring 18.

The same result occurs with the link-bar connections at both ends of the bars 1 in Fig. 2, except that the vehicle springs 18 absorb the shocks, and this device will be suitable for heavier loads. Also in Fig. 3 the connections being all springs as at 34 and 35, the carrier is suitable for loads of a frangible nature where all shocks are avoided.

It has been found in practice, that when a load carrier has been rigidly clamped upon a combined axle- and differential-housing of a motor-vehicle, that strong jars or shocks during travel cause the carrier and its loading if heavy to exercise such a torsion upon these housings, as to pull strongly longitudinally upon the longitudinal driving-shaft to the differential and thus jar and break loose the motor connections to the vehicle-frame. My arrangement whereby the load-carrier is loosely non-torsionally mounted upon the axle-housing prevents any torsional action upon the latter or its connections to the motor whatever, so that the jar is distributed upon different parts of the vehicle without possibility of damage thereto.

Having described my invention, what I claim as new, and desire to secure by Letters Patent, is:

1. The combination with the rear axle of a vehicle and a frame mounted thereabove, of bars positioned across said axle loosely for non-torsional movements thereon, and linking-means engaged between the ends of the bars and adjacent parts of said frame movably.

2. The combination with the rear axle of a vehicle and a frame mounted thereabove, of bars positioned across said axle movably, and linking-means movably engaged between the bars and said frame, certain of the linking-means being resilient.

3. The combination with the rear axle of a vehicle and a frame mounted thereabove, of bars mounted movably across said axle, and resilient linking-means engaged between said bars at front and to the rear of the axle to said frame.

4. The combination with the rear axle of a vehicle and a frame mounted thereabove, of bars mounted pivotally across said axle and movably linked to the frame at opposite ends of the bars, certain of the linking connections being pivoted to and between the bars and frame.

5. The combination with the rear axle of a vehicle and a frame mounted thereon, of bars positioned across and rockingly secured to said axle, and connections between opposite ends of said bars and said frame, of which certain are pivotal and others only are resilient.

6. The combination with the rear axle of a vehicle and a frame mounted thereon, of bars rockingly mounted on and across said axle, and connections between opposite ends of said bars and parts of the frame adjacent thereto.

7. The combination with the rear axle of a vehicle and a frame mounted thereon, of brackets mounted to rock on said axle, and yieldable connections between said brackets and said frame forward of and to the rear of said axle.

8. The combination with the rear axle of a vehicle and a frame mounted thereon and thereabove, of a bracketed carrying structure whose forward parts project across and are pivotally supported on the axle, and linking-connections between said structure and said frame, connected movably between both the parts of the structure which are anterior and to the rear of the axle and to the parts of the frame adjacent thereto, the structure projecting to the rear of said frame.

9. The combination with the rear axle of a vehicle and a frame mounted thereabove, of a carrier positioned to the rear of said axle and frame having parts projecting forwardly across and rockingly mounted on said axle, and equalizing connections between said frame and parts of the carrier structure which are respectively in advance of and to the rear of said axle.

10. The combination with the rear axle of a vehicle and a frame mounted thereabove, of bracket-bars mounted rockingly across said axle, equalizing connections between said frame and parts of said bracket-bars in advance of and to the rear of said axle, and extension-brackets removably secured on the rear parts of said brackets to be positioned to the rear of both said axle and said frame.

11. The combination with the rear axle of a vehicle and a frame mounted thereabove, of a platform positioned in the rear of both said axle and said frame, and supporting connections between said platform and said frame and axle respectively, connected movably to both and non-torsionally to the axle to support the platform substantially horizontal.

12. The combination with the rear axle of a vehicle and a frame mounted thereabove, of a collapsible platform, bracket-bars mounted rockingly across and upon said axle, yielding connections between said frame and parts of the bracket-bars in advance of and to the rear of the axle, and means for removably mounting said platform on the rear ends of said bracket-bars.

13. The combination with the rear axle of a vehicle and a frame mounted thereabove, of load-carrying bracket-bars pivoted on and across the axle substantially medially, resilient connections between the forward ends of the bars and said frame, and an extension structure removably mounted on the rear ends of said bars.

14. In combination in a vehicle, and with an axle thereof, of a load-carrier structure movably non-torsionally mounted upon said axle, and means engaged between said structure and said vehicle operative upon said structure to maintain it in equilibrium and supported upon the axle.

15. In combination in a vehicle and with an axle thereof, of a load-carrier structure supported non-torsionally upon said axle, and means engaged between said structure and vehicle at different parts of each adapted to maintain the said structure in equilibrium upon the axle whether loaded or unloaded.

16. In combination in a vehicle and with an axle thereof, of a load-carrier structure movably mounted upon the axle, and means operative yieldingly upon different parts of said structure adapted to maintain it whether loaded or unloaded in a yieldable state of equilibrium upon the axle and wholly supported upon said axle.

17. The combination with an axle of a vehicle, of a load-carrier structure loosely rockingly mounted thereon and having a removable section secured thereto, said section being composed of swingingly connected bars adapted to be swingingly collapsed together when said section is removed.

18. The combination with an axle of a vehicle and a frame, of a load-carrier positioned near said axle, laterally-spaced bracket-elements supported across said axle, and links movably connected between said frame and parts of each of said bracket-elements at opposite sides of the axle, said devices being adapted to coact while the vehicle is traveling and the carrier is under load to dampen shocks transmitted from the carrier to said bracket-elements.

Signed at Waterloo, Iowa, this 5th day of December, 1922.

GEORGE COLVIN KENNEDY.